2,998,315
LOW SODIUM MILK AND PROCESS OF MANUFACTURE

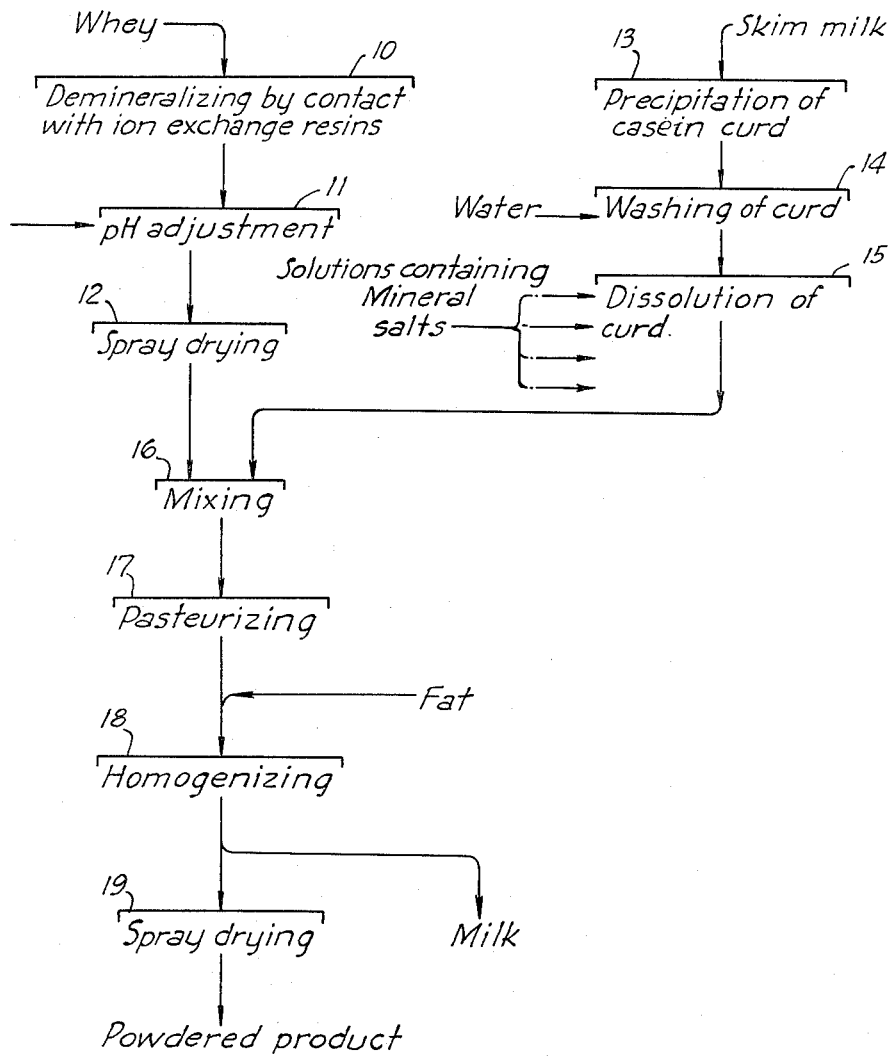

David D. Peebles, Davis, and Paul D. Clary, Jr., Petaluma, Calif., assignors to Foremost Dairies, Inc., San Francisco, Calif., a corporation of New York
Filed June 2, 1958, Ser. No. 739,320
6 Claims. (Cl. 99—54)

This invention relates generally to low sodium milk for human consumption, and to processes for manufacturing the same.

For dietetic purposes, there is a demand for a high quality milk having a low sodium content. One process for the commercial manufacture of such a product involves the exchange or replacement of the sodium ion of dairy milk with a metal ion that is not objectionable from a dietary standpoint, such as potassium. The mineral salt balance is thereby maintained to the extent necessary to prevent precipitation of casein and albumen. One difficulty with this process is that it is relatively expensive in comparison with the present method, due to the nature of the exchange mediums required, and the cost of the source materials employed.

In general, it is an object of the present invention to provide a relatively inexpensive process which can be employed for the large scale production of low sodium milk suitable for human consumption.

Another object of the invention is to provide a process which employs low cost source materials for the manufacture of a low sodium milk.

Another object of the invention is to provide a new article of manufacture, namely a low sodium milk having its albumen and casein in stable colloidal suspension, and synthesized from whey solids and casein.

Additional objects and features of the invention will appear from the following description in which the preferred embodiment has been set forth in detail in conjunction with the accompanying drawing.

The single figure of the drawing is a flow sheet illustrating one procedure for carrying out the present invention.

The present invention involves the use of edible whey from which minerals normally present have been largely removed, as by contacting the whey with ion exchange resins. The whey is used as a source of albumen and lactose. Also it employs a relatively soft casein curd precipitated from a suitable source material such as skim milk, and washed whereby it is relatively free of dissolved sodium salts (e.g. NaCl). This washed casein curd is dispersed in a solution of mineral salts, thereby forming a stable casein sol that is blended with the demineralized liquid whey. Thereafter, any desired fat content can be added, and the material reduced to a powdered product as by spray drying. The resulting product has a sodium content of the order of 500 p.p.m. (dry solids basis).

The procedure outlined in the accompanying drawing is as follows: A demineralized liquid whey is produced by a suitable demineralizing operation, as by contacting the liquid whey with ion exchange resins. As is known to those familiar with ion exchange resins, removal of mineral salts from a liquid material can be effected by passing the material successively through columns of cation and anion exchange resins. Contact with the cation exchange resin serves to remove such metal ions as calcium, magnesium, sodium, potassium and iron. Contact with the anion resin removes such ions as phosphorous, chlorine, iodine, and fluorine. Demineralization of edible liquid whey is disclosed and claimed in Patent No. 2,465,906. In a typical instance the liquid whey being demineralized may have an ash content of from 8 to 13.5% of the solids. The demineralizing treatment produces a whey having an ash content of the order of from 0.5 to 1% of the solids. The sodium content of such a demineralized whey is of the order of from 0.05% to 0.1% (dry solids basis-expressed as NaCl) in contrast with a sodium content of the order of from 0.8% to 1.4%, in the solids of the original liquid whey.

Demineralizing of the liquid whey not only reduces its sodium content, but in addition it removes other minerals and undesired acidic components introduced into the whey by the process from which the whey may be a by-product, as for example the manufacture of cheddar cheese.

The demineralized whey is shown being adjusted as to pH in step 11. This can be carried out by blending the whey with a sufficient amount of decationized whey from the demineralizing operation, whereby the pH is adjusted to slightly less than neutrality, such as pH 6.8. Thereafter it is desirable to reduce it to dry powdered form by spray drying 12.

The casein employed is shown being precipitated from skim milk in operation 13. It is desirable in this connection to employ raw skim milk which has not been subjected to previous heat treatment, although pasteurization temperatures can be applied. There should be no substantial denaturing or coagulation of the skim milk by heat treatment. Ordinary acid precipitation of the casein curd can be employed. Excessive temperatures during and following precipitation should be avoided. In general, it is satisfactory to precipitate at temperatures of the order of from 80° to 110° F., and at a pH ranging from 4.3 to 4.7, depending upon the temperature. Final elevation of the temperature to about 120° F. can be used to facilitate separation of the curd.

When casein is precipitated with an acid, a shift in equilibrium occurs in which metal ions, including sodium, are liberated from the casein. Therefore precipitation and separation of casein effects of itself some sodium elimination because sodium ion that is eliminated from the casein by virtue of the aforementioned shift in equilibrium remains with the whey.

Known methods can be used for separating the precipitated curd from the whey, thereby producing a soft curd suitable for washing in step 14, and having a solids content that may range from about 20 to 28%. Washing is continued to effect a substantial reduction in mineral salt content, thereby largely eliminating soluble sodium salt. Washing can commence with ordinary tap water and be completed by the use of distilled water. The effectiveness of the wash can be determined by suitable methods of titration. One method that has been used is to solubilize an amount of casein curd equivalent to 1 gram of solids in 50 cc. of $1/10$ normal sodium hydroxide, and then titrate this solution to pH 7 using $1/10$ normal acid. The difference between the original 50 cc. of alkali and the amount of acid used is the amount of $1/10$ normal alkali needed to neutralize the acidity of the curd. In practice, when 4.5 cc. of $1/10$ normal sodium hydroxide solution effects neutrality, the washing has been completed to the extent desired. The moist curd from the washing operation 14 may in typical instances contain from 20 to 28% solids. It may be frozen if storage is desired.

In step 15 the washed curd is dispersed in solutions of mineral salts to produce a stable casein sol. The mineral salts thereby added are such as will form a stable milky white sol with the casein, and a stable milk when the casein is intermixed with the demineralized whey. The best results have been secured by progressively mixing the casein with a plurality of solutions. The solution first employed is alkaline and can consist of alkaline reagents like potassium hydroxide, ammonium hydroxide, or both. The last solution consists of mineral salts that provide an acid reaction, and which serve to provide an optimum mineral salt concentration and hydrogen ion concentration.

After stirring the casein sol for a short time (e.g. 2 minutes) a measured amount of demineralized whey powder is added, together with some distilled water. The amount of whey is such as to provide lactose and albumen contents corresponding substantially to ordinary dairy skim milk. The added water provides a proper concenration for subsequent spray drying. Agitation is continued for a sufficient period to complete dispersion.

After mixing at 16 it is desirable to heat the material to an elevated pasteurizing temperature of about 143° F. with a holding period at that temperature of about 30 minutes. This effects pasteurization and imparts a more natural milk color, in contrast with an initial watery appearance.

Assuming that it is desired to provide the final product with a fat content, a suitable amount of fat, such as butter fat, is added and the material subjected to homogenizing at 18. As indicated, such homogenized material may be used as itself as a stable synthetic milk. However, it is generally desirable to subject the homogenized material to spray drying 19, thereby producing a dry powdered milk product.

The milk product produced as described above can be used by persons suffering from hypertension or like disturbances where a low sodium diet is prescribed. It has amounts of casein, albumen (from the whey) and lactose (from the whey) corresponding to dairy milk, and a mineral salt balance that makes for complete stability. The solubility index of the powdered product is relatively low, as for example from 0.1 to 0.5, whereby when dispersed in water it forms a stable reconstituted milk. In general the reconstituted milk exhibits characteristics substantially the same as natural milk, and its dietetic value is the same except for the low sodium content. The final powder can be instantized to facilitate quick dispersion in water. Thus it can be placed in the form of porous aggregates like "instant" dry skim milk now available.

A specific example of the process is as follows:

*Example 1.*—A demineralized whey was prepared by passing liquid whey through cationic and anionic exchange resin columns thereby producing a demineralized liquid material having an ash content of about 0.5%. The pH was adjusted to 6.8 by the addition of decationized whey, after which it was concentrated by vacuum evaporation and spray dried. A washed casein was obtained by precipitation from skim milk at a pH of 4.6, using hydrochloric acid, and at a temperature of about 100° F. The casein curd obtained was drained and washed with fresh water, followed by washing with distilled water, to produce a curd containing about 27% solids, and titratable in accordance with the procedure previously described. The curd was then dissolved by the use of solutions as follows:

| Solution No. | Reagent | Molar Concentration |
|---|---|---|
| 1 | NH$_4$OH | 0.9 |
|   | KOH | 0.4 |
| 2 | Ca(OH)$_2$ | 0.3 |
| 3 | CaCl$_2$ | 0.6 |
| 4 | MgO | 0.1 |
|   | Citric acid | 0.3 |
|   | H$_3$PO$_4$ | 0.5 |
|   | KOH | 0.6 |

The foregoing solutions were added to the washed casein curd as follows: For each 100 grams of the curd, there was added about 25 ml. of the first solution together with 675 ml. of the second solution, to provide a pH of 11.0. Agitation was continued for about thirty minutes until the casein had completely dispersed. Then 25 ml. of the third solution was added with continued agitation. Thereafter 50 ml. of the fourth solution was added slowly with continued agitation, to thereby produce a pH of about 6.8. Before adding the fourth solution, the casein sol was relatively transparent. However upon adding the fourth solution there was a noticeable change in that the sol took on the whitish appearance of natural milk.

The spray dried demineralized whey was added to the casein sol in the proportions of 63.0 grams of whey powder to an amount of sol prepared from 100 grams of washed casein curd (at 27% solids), and sufficient distilled water was added to provide a total weight of 1000 grams. Agitation was applied to effect complete dispersion. The material was then heated to 143° F. and held at such temperature for thirty minutes. An amount of butter fat was added whereby the resulting material contained 2% fat (liquid basis). Thereafter the material was homogenized to form a stable synthetic milk having the characteristics previously described. Also this material was subjected to spray drying to produce a dry powdered milk product. The final product had an ash content of 6.3%, and a sodium content of 500 p.p.m. (dry solids basis). Its analysis was as follows:

| | |
|---|---|
| Toluol moisture | 3.3 |
| Ash | 6.3 |
| Protein (N x 6.38) | 28.6 |
| Lactose | 43.9 |
| Acid (as lactic) | 0.7 |
| Fat | 17.2 |
| pH (10% solution) | 6.8 |

The powdered product obtained from the foregoing example had all of the desirable properties previously described.

The four particular solutions mentioned in the foregoing example contain the more important metal ions found in normal milk, including calcium, magnesium and potassium. No sodium ion is present, and the amount of potassium and/or ammonia ion contained in the solutions is such as to take the place of the sodium ion normally present in milk.

In practising the present process we have made up the first alkaline solution with molar concentrations ranging from about 1.0 to 1.5 (1.3 optimum) and have prepared it entirely of potassium hydroxide, entirely of NH$_4$OH, and various proportions of these reagents. Assuming use of NH$_4$OH, substantially all of the ammonia radical is combined with acid radicals in the final product, and therefore is stabilized. Also we have varied the CaCl$_2$ solution from 0.4 to 0.8 molar, and we have varied the Ca(OH)$_2$ solution from 0.2 to 0.4 molar. With respect to the fourth solution, we have likewise varied the concentrations of the various salts, as for example within an overall range of from 1.3 to 1.7 molar (1.5 optimum). We have varied the amounts of the solutions employed, particularly taking into account variations in concentrations. The first and second alkaline solutions provide a completely dissolved sol at a pH of about 10.5 to 11.5 (pH 11 optimum). Addition of the third solution causes some shift of pH towards neutrality. Thus where the first and second solutions provide a sol at pH 11.0, the third solution may shift the pH to about 9.5. The fourth solution adjusts the pH to that of natural fresh milk, namely about 6.5 to 6.9 (6.8 optimum).

In the foregoing description we have referred to the use of two source materials, namely edible whey and the skim milk. Instead of using two sources of material, it is possible to employ skim milk alone, and utilize the whey produced by the casein precipitating operation 13 as a source of whey for the demineralizing operation 10. Where separate sources of material are employed, then byproduct whey is produced which can be utilized for various purposes, as for example, for the manufacture of lactose.

We claim:

1. In a process for the manufacture of a low sodium milk containing albumen and casein in stable colloidal solution, together with lactose, the steps of forming a washed precipitated casein curd, dispersing the casein in an alkaline solution substantially free of sodium to form a sol at about pH 10.5–11.5, adding a solution of mineral salts to the sol to provide a whitish material at pH 6.5 to 6.9, and thereafter intermixing the casein sol with edible and demineralized whey to provide the desired amounts of albumen, casein and lactose in the resulting stable synthetic milk.

2. A process as in claim 1 in which a calcium salt is added to the sol before adding the solution of mineral salts.

3. A process as in claim 1 in which the whey mixed with the casein sol is in the form of a dry powder.

4. A process as in claim 1 in which the resulting stable synthetic milk is converted to the form of a dry powder.

5. In a process for the manufacture of a low sodium milk containing albumen and casein in stable colloidal solution, together with lactose, the steps of forming a washed precipitated casein curd, dispersing the casein, for each 100 grams of the same, in about 25 milliliters of a solution consisting of ammonium hydroxide and potassium hydroxide in molar concentrations of 0.9 and 0.4 respectively, to which solution there is added about 675 milliliters of a second solution comprising a calcium hydroxide in molar concentration of about 0.3, thereafter adding to the dispersion about 25 milliliters of a third solution comprising calcium chloride in molar concentration of about 0.6, and lastly adding to the dispersion about 15 milliliter of a fourth solution comprising magnesium oxide, citric acid, phosphoric acid and potassium hydroxide in molar concentrations of about 0.1, 0.3, 0.5 and 0.6 respectively, all said solutions and the casein dispersed therein forming a sol having a pH of about 6.8 and having the whitish appearance of natural milk, and thereafter intermixing the casein sol with edible and demineralized whey to provide a stable synthetic milk.

6. A process as in claim 5 in which the demineralized whey is in the form of a dry powder having an ash content of from 8 to 13.5%.

References Cited in the file of this patent

UNITED STATES PATENTS

| | | |
|---|---|---|
| 2,465,906 | Meade et al. | Mar. 29, 1949 |
| 2,465,907 | Meade et al. | Mar. 29, 1949 |
| 2,707,152 | Chaney et al. | Apr. 26, 1955 |
| 2,708,632 | Stimpson | May 17, 1955 |
| 2,708,633 | Stimpson et al. | May 17, 1955 |
| 2,793,953 | Loo | May 28, 1957 |
| 2,879,166 | Wilcox | Mar. 24, 1959 |